US012121924B2

(12) United States Patent
Davies et al.

(10) Patent No.: US 12,121,924 B2
(45) Date of Patent: Oct. 22, 2024

(54) FLUID TIP

(71) Applicant: Carlisle Fluid Technologies (UK) Ltd, Bournemouth (GB)

(72) Inventors: Simon Davies, Blandford Forum (GB); Stephen John Mannouch, Sturminster Newton (GB)

(73) Assignee: Carlisle Fluid Technologies UK Ltd

(*) Notice: Subject to any disclaimer, the term of this patent is extended or adjusted under 35 U.S.C. 154(b) by 328 days.

(21) Appl. No.: 16/521,534

(22) Filed: Jul. 24, 2019

(65) Prior Publication Data

US 2020/0030831 A1 Jan. 30, 2020

(30) Foreign Application Priority Data

Jul. 24, 2018 (GB) ..................................... 1812070

(51) Int. Cl.
*B05B 7/06* (2006.01)
*B05B 7/08* (2006.01)

(52) U.S. Cl.
CPC ............ *B05B 7/068* (2013.01); *B05B 7/0815* (2013.01)

(58) Field of Classification Search
CPC ....... B05B 7/0815; B05B 7/068; B05B 1/002; B05B 7/06
See application file for complete search history.

(56) References Cited

U.S. PATENT DOCUMENTS

| | | | | | |
|---|---|---|---|---|---|
| 5,088,648 | A * | 2/1992 | Schmon | B05B 7/0815 239/296 |
| 5,152,460 | A * | 10/1992 | Barty | B05B 7/0081 239/290 |
| 5,199,644 | A * | 4/1993 | Haferkorn | B05B 7/0081 239/290 |
| 2018/0133727 | A1 | 5/2018 | Schmon et al. | |

FOREIGN PATENT DOCUMENTS

| | | | |
|---|---|---|---|
| DE | 611325 | C | 3/1935 |
| EP | 1118387 | A2 | 7/2001 |
| GB | 154736 | A | 12/1920 |
| GB | 1388468 | A | 3/1975 |

OTHER PUBLICATIONS

EP Examination Report for EP Application No. 19186605.2 dated Dec. 16, 2019, 6 pgs.
GB Search Report, Application No. GB1812070.9, mailed Jan. 17, 2019, 3 pgs.
EP Examination Report for EP Application No. 19186605.2 dated Dec. 1, 2020, 6 pgs.

* cited by examiner

*Primary Examiner* — Steven M Cernoch
(74) *Attorney, Agent, or Firm* — Peter J. Beardsley; OMNUS Law

(57) ABSTRACT

A fluid tip for use with a spray gun. The fluid tip comprises an air cap and a paint nozzle. The air cap comprises an inner surface 206 and the paint nozzle comprises an outer surface 208. The inner and outer surfaces define sides of an air channel 203. The inner and outer surfaces are defined by (Continued)

contours, each contour terminating to form an air channel outlet 207 for discharging an air jet proximal a paint nozzle outlet of the paint nozzle. The contours are configured to provide a velocity profile 400 across the air channel outlet 207 of an air flow 401 through the air channel 203 in which velocities of air radially closer to the paint nozzle outlet are substantially higher than velocities radially further from the paint nozzle outlet.

19 Claims, 3 Drawing Sheets

FLUID TIP

FIELD OF THE INVENTION

The invention relates to paint spray guns. More specifically, the invention relates to fluid tips for discharging atomising air and paint from a paint spray gun.

BACKGROUND

Paint spray guns are often used to apply paint to a medium such as a vehicle body panel. Paint spray guns usually use a process called atomisation for breaking down the liquid paint into small particles (i.e. a spray) before it is applied to the medium. Atomisation is achieved by mixing a paint jet and an "atomising" air jet. Mixing between these jets causes atomisation of the liquid paint.

Existing paint spray guns include a fluid tip that comprises an air cap and a paint nozzle. The air cap provides a jet of atomising air from an air cap outlet that is proximal to the paint nozzle thereby enabling the necessary mixing between the jets for atomisation of the paint. A high pressure air source is often used to provide the jet of atomising air.

Suction feed spray guns "suck" paint fluid through the nozzle by using the jet of atomising air provided by a high pressure source to draw paint through the paint nozzle. The efficiency of the spray gun can be measured by comparing of the energy used to generate the high pressure atomising air jet and the quality of the resulting paint jet. It is desirable to improve the efficiency of the spray gun.

Strong atomising air jets provide for a finer atomisation that generates a finer paint spray. However increasing the strength of atomising air jets increases the volume of undesirable high-frequency hissing noises, causes higher air consumption, and results in higher operating costs.

SUMMARY

According to a first aspect of the invention there is provided a fluid tip for use with a paint spray gun. The fluid tip comprises an air cap and a paint nozzle. The air cap comprises an inner surface and the paint nozzle comprises an outer surface. The inner and outer surfaces define sides of an air channel. The inner and outer surfaces are defined by contours, each contour terminating to form an air channel outlet for discharging an air jet proximal a paint nozzle outlet of the paint nozzle. The contours are configured to provide a velocity profile across the air channel outlet of an air flow through the air channel in which velocities of air radially closer to the paint nozzle outlet are substantially higher than velocities radially further from the paint nozzle outlet.

Adjustment of the velocity profile of the air flow through the air channel results in an increased velocity of air discharged from the air outlet (i.e. the air jet) at locations radially closest to the paint nozzle. This causes a weakening and displacement of ring vortices that are generated by the mixing air and paint jets in front of the centre of the paint nozzle thereby lessening turbulence. These flow effects provide several advantages:

Firstly, instability of the paint jet is lessened thereby reducing vibrations of the paint jet at the paint nozzle outlet. Such vibrations are known as "flapping". Flapping of the paint jet causes displacement of heavier/bigger size droplets towards the edges of a spray cone generated by the fluid tip. This phenomenon leads to an undesirable spray pattern having heavy paint deposition at the edges and a lighter paint density at the centre. The reduced instability of the discharged paint flow provides a more uniform spray pattern.

Secondly, the reduction in vibrations leads to a reduction in the noise produced during operation of the spray gun.

Thirdly, the adjusted velocity profile allows for wider channels and/or a lower operating pressure to be used for atomising air. A wider atomising air jet provides for finer atomisation of the paint jet at lower operating air pressures. Without the adjusted velocity profile, a wider channel and/or a reduced operating pressure (for a given mass flow rate of the atomising air jet) would result in a reduction in the suction to the paint fluid provided by the atomising air jet and a reduced fineness of atomisation. The adjusted velocity profile compensates for such reductions.

Optionally, the inner surface is defined by a convex contour and the outer surface is defined by a concave contour.

Optionally, the contours defining the inner and outer surfaces are curvilinear.

Optionally, the contours are configured to provide a velocity profile of air across the air outlet following a parabolic distribution having a maximum velocity radially closest to the paint nozzle.

Optionally a separation distance between the paint nozzle outlet and the air outlet is based on a predetermined viscosity of paint flowing through the paint nozzle outlet. The separation distance may further be based on one or more of surface tension, density and dynamic viscosity of the paint flowing through the paint nozzle outlet.

A reduction in separation between the paint nozzle outlet and the air outlet reduces the size of ring vortices in the discharged paint flow thereby helping to reduce the noise caused by turbulence. A reduced separation results in a reduction in suction provided by the atomising air flow. However, the reduced suction is compensated for by the adjusted velocity profile of the air flow providing an increased velocity in the regions of the discharged air jet close to the paint flow.

An increased width of the air channel at the air outlet aids generation of a desirable velocity profile of the air across the air outlet.

Optionally, the air channel and/or the air outlet surrounds the paint nozzle.

Optionally, the air channel and/or the air outlet are annular around the paint nozzle.

Optionally, the channel width between the sides of the air passages reduces towards the air outlet.

Optionally, the air outlet is configured to discharge air in the same direction as paint discharged from the paint nozzle outlet.

Optionally, the fluid tip further comprises one or more horns protruding from an external surface of the air cap, each of the one or more horns comprising auxiliary air passages configured to discharge an auxiliary air jet towards an atomisation region downstream of the paint nozzle outlet.

According to a second aspect of the invention there is provided a spray gun comprising a fluid tip according to the first aspect of the invention.

DETAILED DESCRIPTION

Figure 1:
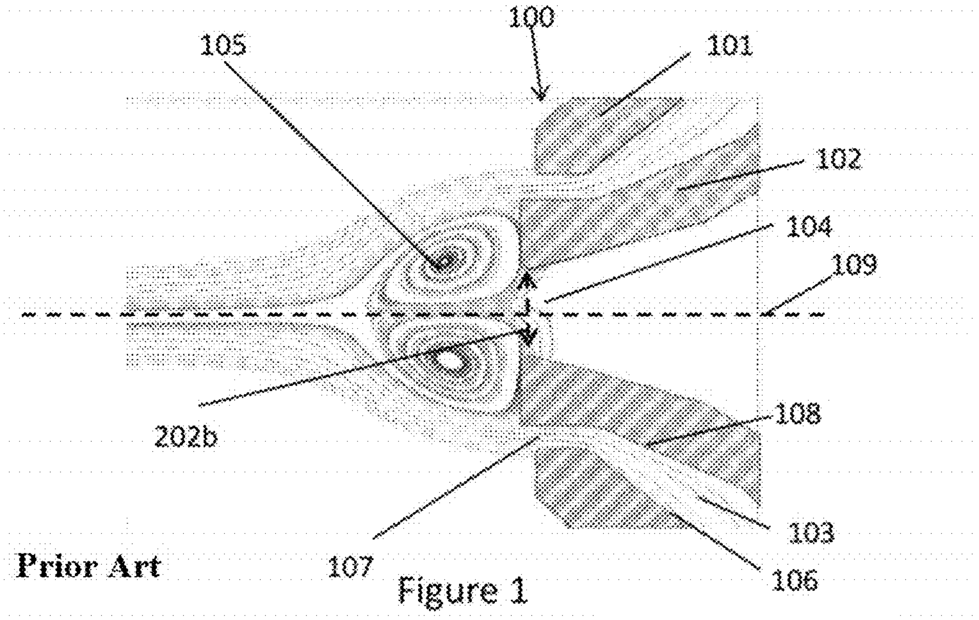
FIG. 1 shows a cross-sectional view of an existing fluid tip including a flow visualisation of the paint and air jets discharged from the existing fluid tip.

With reference to FIG. 1 an existing fluid tip 100 includes an air cap 101 that substantially surrounds a paint nozzle 102. An air cap inner surface 106 and paint nozzle outer surface 108 form an air channel 103. In use, air flows through the air channel 103 and is discharged at an air channel outlet 107 to provide an air jet. Paint flows through the paint nozzle 102 and is discharged at a paint nozzle outlet 104 to provide a paint jet. The paint nozzle 102 and air channel 103 are disposed about a central axis 109. The air channel outlet 107 is annular around the paint nozzle outlet 104. In operation, the discharged air jet surrounds the discharged paint jet. The resulting mixing between these jets causes atomisation of the paint (i.e. a paint spray).

It can be observed from the flow visualisation of FIG. 1 that ring vortices 105 are generated due to the mixing between the air and paint jets. The inventor has determined that these ring vortices 105 are the main form of noise-generating turbulence associated with mixing of the air and paint jets.

Figure 2:
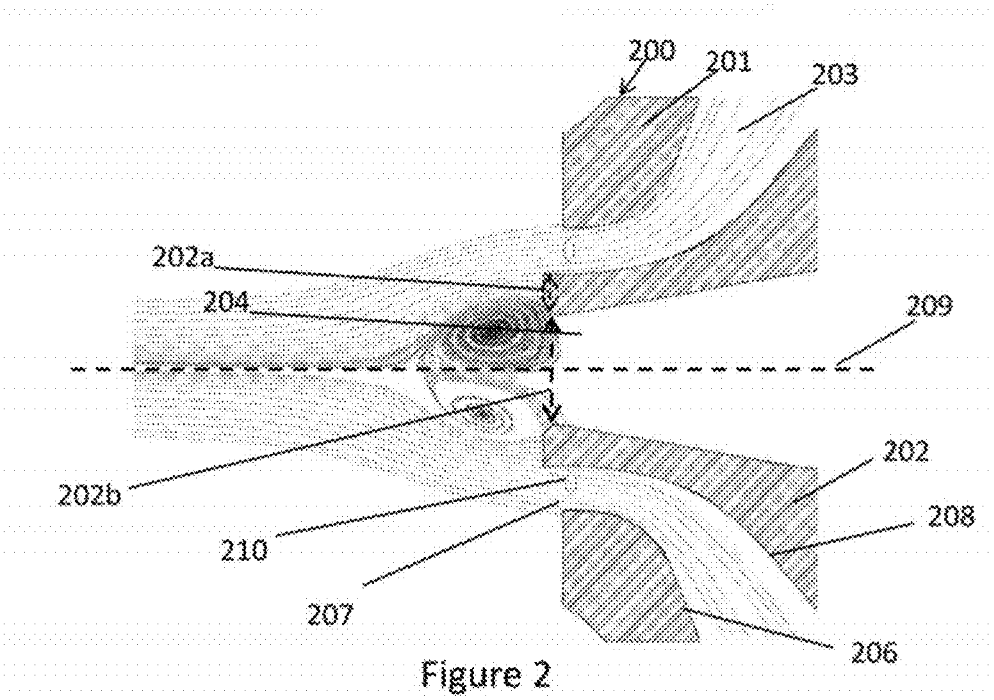
FIG. 2 shows a cross-sectional view of a fluid tip according to the invention including a flow visualisation of the paint and air jets discharged from the fluid tip.

FIG. 2 shows a fluid tip according to this disclosure. An air cap 201 substantially surrounds a paint nozzle 202. The air cap 201 and paint nozzle 202 are rotated about a central axis 209 thereby forming an annular air channel outlet 207. An outer surface 208 of the paint nozzle 202 and an inner surface 206 of the air cap 201 form the sides of an air channel 203. In use, air is discharged from the air channel 203 at an air channel outlet 207. Paint is discharged from the paint nozzle 202 at a paint nozzle outlet 204. The paint nozzle has a paint nozzle thickness 202*a* defined by the distance from the air channel outlet 207 to the paint nozzle outlet 204. The paint nozzle thickness may be referred to as the separation distance between the paint nozzle outlet and the air outlet. An air cap inner surface 206 and paint nozzle outer surface 208 are defined by contours. In other words, the sides of the air channel 203 are defined by contours. The contours are configured to adjust the velocity profile of the air flowing through the air channel by increasing the velocity of discharged air at (or proximal to) the edge of the air channel outlet 207 closest to the paint nozzle outlet 204. In other words there is an increased region of high velocity air 210 proximal the paint nozzle outlet 204 as indicated by the flow visualisation of FIG. 2. This adjustment in the velocity profile of the air flow is caused, at least in part, by the geometry of the air channel 203 upstream of the air channel outlet 207. In particular, in the shown embodiment, the inner surface 206 is defined by a curvilinear convex contour. The outer surface 208 is defined by a curvilinear convex contour.

The paint nozzle thickness 202*a* is less compared to that of the fluid tip shown in FIG. 1*a*. The paint nozzle thickness depends on the viscosity of paint flowing through the paint nozzle outlet. If the paint comprises no or minimal viscosity, an optimum paint nozzle thickness can be determined by the equation:

$$T=4.44\times d$$

Where T is the paint nozzle thickness, and d is an internal diameter 202*b* of the paint nozzle outlet. If the paint comprises significant viscosity, or is considered to be a viscous liquid, then the paint nozzle thickness is based on one or more of surface tension, density and dynamic viscosity of the paint.

The reduced paint nozzle thickness 202*a* provides for the discharged air jet from the air outlet 207 to be closer to the discharged paint from the paint outlet 204. This causes weakening of ring vortices 205 that are generated due to the mixing between the jets. The ring vortices 207 are also displaced towards the centreline 209. This effect can be observed by comparing the flow visualisation of the ring vortices 205 of the discussed embodiment with the ring vortices 105 shown in FIG. 1. The weakening and displacement of the ring vortices 205 lessen the level of noise-generating turbulence from the fluid tip of FIG. 2 in comparison to that observed with the fluid tip of FIG. 1.

Use of the reduced paint nozzle thickness 205 enables a wider air channel 203 to be utilised. The inventor has determined that providing a wider air channel 203 (i.e. increasing the distance between the inner surface 206 and the outer surface 208) allows for high quality performance of the paint spray gun whilst using lower operating pressures for the air and/or paint jet. The wider air jet that is discharged from the wider air channel 203 provides for a finer atomisation of the paint flow at lower operating pressures.

Embodiments of the disclosure may be applied to suction feed spray guns where the air jet provides a suction force to draw paint through the paint outlet 204. Lessening and displacement of the ring vortices 205 discussed above reduces the amount of suction that is provided. However, providing the region of high velocity air 210 close to the paint outlet 204 provides an increase in suction to offset suction that is reduced due to the reduction of ring vortices 205.

Furthermore, the atomised paint jet resulting from the mixing of the air and paint jets caused by the fluid tip 200 of FIG. 2 is observed to be more stable downstream of the outlets due to the lessening and displacement of the vortices 205. In other words there is an increased liquid (paint) core stability. Therefore, there is less undesirable "flapping" of the atomised paint jet. "Flapping" reduces the quality of the paint spray pattern arising from the mixture of the paint and air jets.

Figure 3:
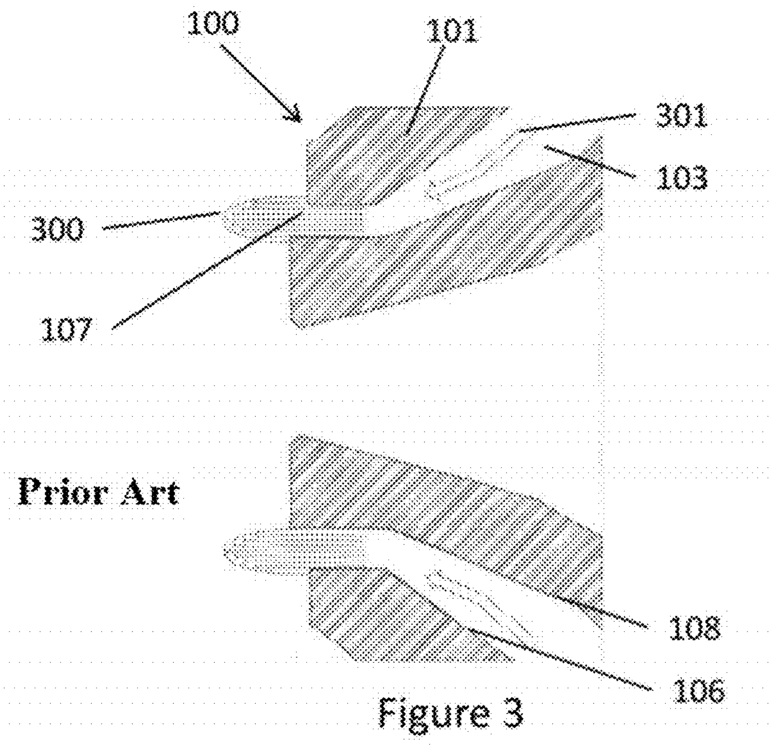
FIG. 3 shows a cross-sectional view of the fluid tip of FIG. 1 including a representation of the velocity profile of the air flow at the air outlet.

FIG. 3 shows the fluid tip of FIG. 1 including a representation of a velocity profile 300 of the air flow at the air channel outlet 107. Arrow 301 indicates the direction of the air flow through the air channel 103. The velocity profile 300 follows a parabolic distribution with the maximum velocity in a central region of the air flow approximately mid-way between the air cap inner surface 106 and the paint nozzle outer surface 108.

Figure 4:
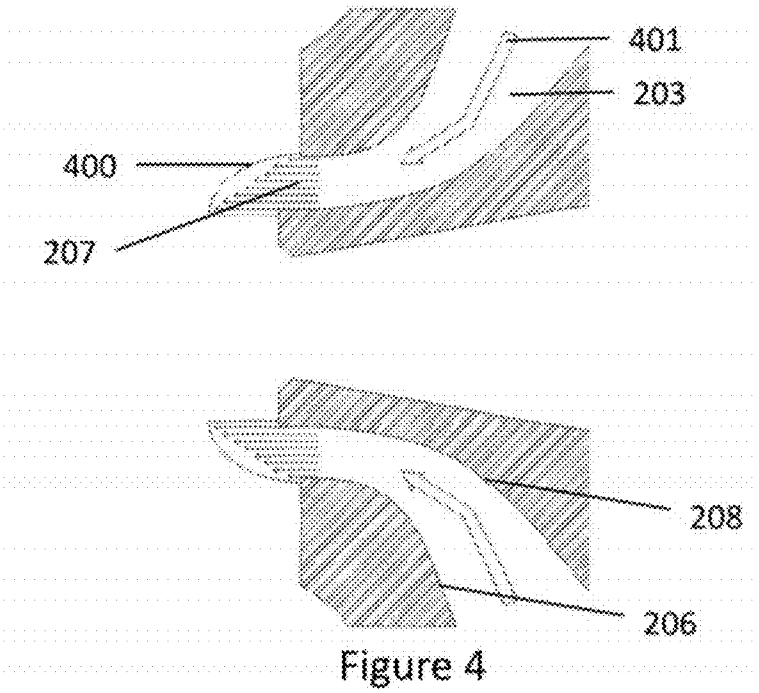
FIG. 4 shows a cross-sectional view of the fluid tip of FIG. 2 including a representation of the velocity profile of the air flow at the air outlet.

FIG. 4 shows the fluid tip of FIG. 2 including a representation of a velocity profile 400 of the air flow at the air channel outlet 207. Arrow 401 indicates the direction of the air flow through the air channel 203. The air cap inner surface 206 and paint nozzle outer surface 208 forming the air channel 203 comprise curvilinear profiles. In particular, the air cap inner surface 206 comprises a convex contour and the paint nozzle outer surface 208 comprises a concave contour. The geometry of the inner and outer surfaces provides for the velocity profile 400 to be generated at the air outlet 207. The velocity profile 400 has maximum velocity close to the paint nozzle outer surface 208 (i.e. close to the paint jet).

Figure 5:
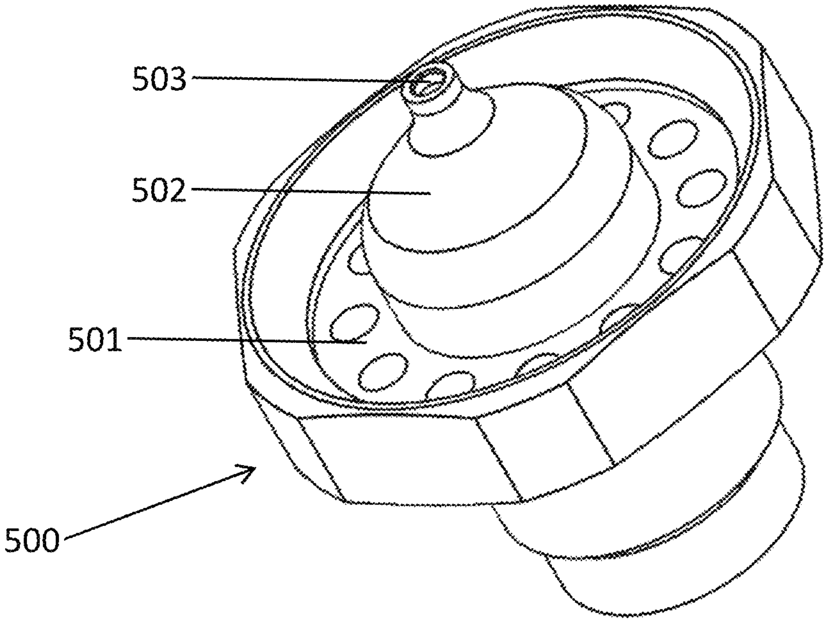
FIG. 5 shows a paint nozzle according to the invention.

With reference to FIG. 5 there is a paint nozzle 500 having paint outlet 503. Air holes 501 are disposed around paint nozzle outer surface 502. The paint nozzle outer surface 502 has a concave and curvilinear profile rotated about a centreline of the paint outlet 503. In the shown example, the paint nozzle outer surface 502 has a bell-shaped surface. In use, high pressure air is blasted through the air holes 501. The blasted air passes through an air channel (not shown) that is bounded on one side by the paint nozzle outer surface 502, and on the other side by an air cap inner surface (not shown). Due to the profiles of the paint nozzle outer surface 502 and air cap inner surface (not shown), the air jet exiting an air outlet (not shown) surrounding the paint outlet 503 comprises a velocity profile having the highest velocity close to the paint outlet 503. Typically, different types of air cap may be supplied for attachment to the paint nozzle of FIG. 5. When an air cap (not shown) is attached to the paint nozzle 500, the air channel (not shown) is formed.

Figure 6:
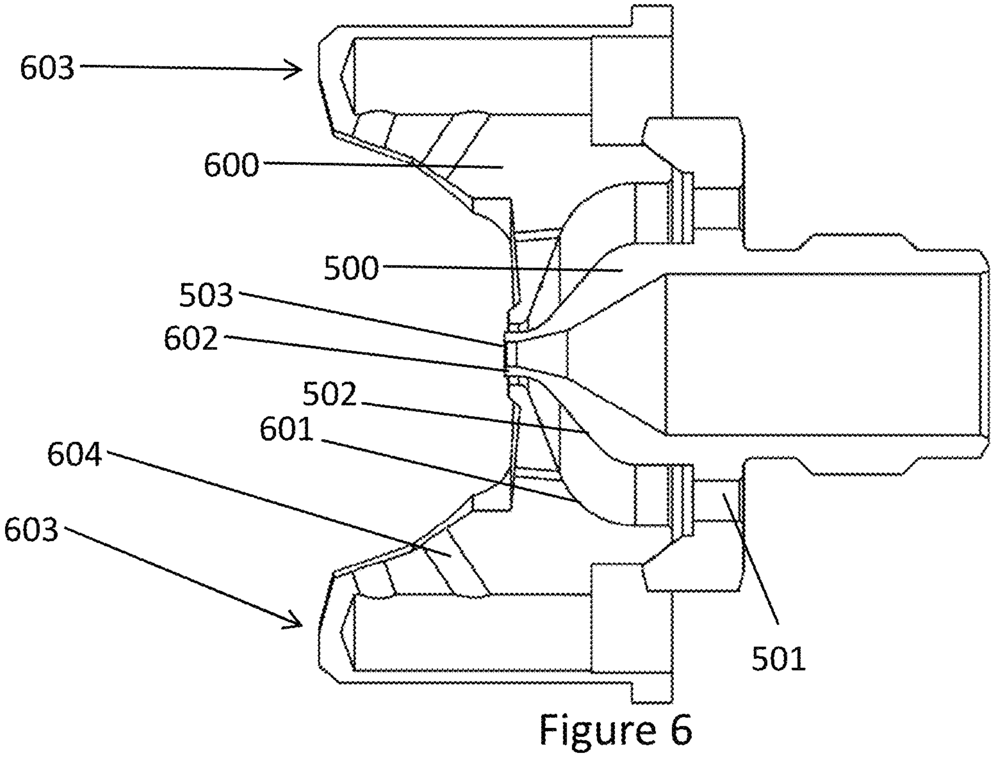
FIG. 6 shows a cross sectional view of a fluid tip comprising a paint nozzle and an air cap according to the invention.

With reference to FIG. 6 there is a cross-sectional view of an air cap 600 attached to the paint nozzle 500 of FIG. 5. The air cap 600 comprises an air cap inner surface 601 that opposes the paint nozzle outer surface 501. The air cap inner surface 600 and the paint nozzle outer surface 501 bound an air channel having an air outlet 602 surrounding the paint nozzle outlet 503. The air holes 501 supply air to the air channel. The air cap inner surface 601 is defined by a curvilinear concave profile and the paint nozzle outer surface 501 is defined by a curvilinear convex profile. The profiles provide for the velocity profile of air at the air outlet 602 to have a maximum velocity at locations close to the paint outlet.

Air cap 600 further comprises two horns 603. Each horn 603 comprises auxiliary air passages 604 for discharging auxiliary air jets downstream of the air outlet 602 and the paint nozzle outlet 503. The auxiliary air jets squeeze the paint spray generated by the outlets 602, 503 to provide additional control over the paint spray that is generated by the mixing between the air and paint jets.

The invention claimed is:

1. A system, comprising:

a fluid tip configured to couple to a paint spray gun, wherein the fluid tip comprises:

an air cap comprising an inner surface;

a paint nozzle comprising an outer surface;

the inner and outer surfaces define sides of an air channel;

the inner and outer surfaces are defined by curvilinear contours that curve in a downstream direction of an air flow through the air channel and turn away from a radial direction toward and axial direction relative to a central axis of the fluid tip, each curvilinear contour terminating to form an air channel outlet configured to discharge an air jet to atomize paint exiting from a paint nozzle outlet of the paint nozzle;

the curvilinear contours are configured to provide a velocity profile across the air channel outlet of the air jet in which velocities of air radially closer to the paint nozzle are higher than velocities radially further from the paint nozzle outlet, wherein the paint nozzle comprises a paint nozzle inner diameter and a paint nozzle thickness, wherein the paint nozzle thickness is configured to be 4.44×the paint nozzle inner diameter for a paint of minimal viscosity.

2. The system of claim 1, wherein the inner surface is defined by a convex contour in the downstream direction, and the outer surface is defined by a concave contour in the downstream direction.

3. The system of claim 1, wherein the curvilinear contours overlap one another over an axial distance along the central axis of the fluid tip and extend directly to the air channel outlet, and the inner and outer surfaces extend in the axial direction at the air channel outlet.

4. The system of claim 1, wherein the curvilinear contours are configured to cause the velocity profile of air jet at the air channel outlet to follow a parabolic distribution having a maximum velocity radially closest to the paint nozzle.

5. The system of claim 1, wherein a separation distance between the nozzle outlet and the air channel outlet is based on a predetermined viscosity of paint flowing through the paint nozzle outlet.

6. The system of claim 5 wherein the separation distance is based on one or more of surface tension, density, and dynamic viscosity of the paint flowing through the paint nozzle outlet.

7. The system of claim 1, wherein the air channel and/or the air channel outlet surrounds the paint nozzle.

8. The system of claim 1, wherein the air channel and/or the air channel outlet are annular around the nozzle.

9. The system of claim 1, wherein the air channel outlet is configured to discharge air in the same axial direction as paint discharged from the nozzle outlet.

10. The system of claim 1, further comprising one or more horns protruding from an external surface of the air cap, each of the one or more horns comprising auxiliary air passages configured to discharge auxiliary an auxiliary air flow towards an atomisation region downstream of the paint nozzle outlet.

11. The system of claim 1, comprising the paint spray gun having the fluid tip.

12. A system, comprising:

a fluid tip configured to couple to a paint spray gun, wherein the fluid tip comprises:

a paint channel extending to a paint nozzle outlet; and an air channel extending to an air channel outlet, wherein the air channel outlet is configured to discharge an air jet to atomize paint exiting from the paint nozzle outlet, wherein a first surface having a first curvilinear contour defines a radially outer boundary of the air channel and a second surface having a second curvilinear contour defines a radially inner boundary of the air channel, the first and second curvilinear contours curve in a downstream direction of an air flow through the air channel and turn away from a radial direction toward an axial direction relative to a central axis of the fluid tip, and the first and second curvilinear contours are configured to provide a velocity profile across the air channel outlet of the air jet in which velocities of air radially closer to the paint nozzle outlet are higher than velocities radially further from the paint nozzle outlet, wherein the paint nozzle outlet comprises a paint nozzle inner diameter and a paint nozzle thickness, wherein the paint nozzle thickness is configured to be 4.44×the paint nozzle inner diameter for a paint of minimal viscosity.

13. The system of claim 12, wherein the paint nozzle outlet is disposed at the central axis of the fluid tip, and the air channel is radially offset from the central axis of the tip.

14. The system of claim 12, wherein the first and second curvilinear contours overlap one another over an axial distance along the central axis of the fluid tip.

15. The system of claim 14, wherein the first and second curvilinear contours extend to the air channel outlet, and the first and second surfaces extend in the axial direction at the air channel outlet.

16. The system of claim 12, wherein the fluid tip comprises an air cap removably positioned about a paint nozzle, the paint nozzle comprises the paint channel extending to the paint nozzle outlet, and the air cap at least partially defines the air channel extending to the air channel outlet.

17. The system of claim 16, wherein the air cap comprises the first surface having the first curvilinear contour that defines the radially outer boundary of the air channel, and the paint nozzle comprises the second surface having the second curvilinear contour that defines the radially inner boundary of the air channel.

18. A system, comprising:

a fluid tip configured to couple to a paint spray gun, wherein the fluid tip comprises an air cap and a paint nozzle, wherein the air cap is configured to be positioned about the paint nozzle, the air cap comprises an inner surface, and the paint nozzle comprises an outer surface;

the inner and outer surfaces define sides of an air channel;

the inner and outer surfaces are defined by curvilinear contours that curve in a downstream direction of an air flow through the air channel and turn away from a radial direction toward an axial direction relative to a central axis of the fluid tip, each curvilinear contour terminating to form an air channel outlet configured to discharge an air jet to atomize paint exiting from a paint nozzle outlet of the paint nozzle; and the curvilinear contours are configured to provide a velocity profile across the air channel outlet of the air jet in which velocities of air radially closer to the paint nozzle outlet are higher than velocities radially further from the paint nozzle outlet, wherein the paint nozzle comprises a paint nozzle inner diameter and a paint nozzle thickness, wherein the paint nozzle thickness is configured to be 4.44×the paint nozzle inner diameter for a paint of minimal viscosity.

19. The system of claim 18, wherein the curvilinear contours overlap one another over an axial distance along the central axis of the fluid tip and extend directly to the air channel outlet, and the inner and outer surfaces extend in the axial direction at the air channel outlet.

* * * * *